(12) United States Patent
Hiller et al.

(10) Patent No.: US 8,732,967 B2
(45) Date of Patent: May 27, 2014

(54) PROCESS AND INCREMENTAL TRANSDUCER FOR DETERMINING AN ACTUAL POSITION OF A BODY ALONG A MEASURING PATH OF A MATERIAL MEASURE HAVING AT LEAST ONE GAP

(75) Inventors: Bernhard Hiller, Berlin (DE); Axel Loharens, Berlin (DE); Roland Kirchberger, Berlin (DE); Michael Schneider, Konstanz (DE)

(73) Assignee: Baumer Innotec AG, Fraunfeld (CH)

( * ) Notice: Subject to any disclaimer, the term of this patent is extended or adjusted under 35 U.S.C. 154(b) by 360 days.

(21) Appl. No.: 13/301,343

(22) Filed: Nov. 21, 2011

(65) Prior Publication Data

US 2012/0124849 A1    May 24, 2012

(30) Foreign Application Priority Data

Nov. 22, 2010 (DE) .......................... 10 2010 061 738

(51) Int. Cl.
  *G01B 7/30* (2006.01)
(52) U.S. Cl.
  USPC ........................................... 33/1 PT
(58) Field of Classification Search
  USPC .............................. 33/1 PT, 534, 706, 707, 708
  See application file for complete search history.

(56) References Cited

U.S. PATENT DOCUMENTS

| | | | |
|---|---|---|---|
| 7,571,552 B2* | 8/2009 | McAdam ......................... | 33/706 |
| 8,584,370 B2* | 11/2013 | Hiller et al. .................... | 33/1 PT |
| 2007/0256313 A1* | 11/2007 | McAdam ......................... | 33/706 |
| 2012/0124848 A1* | 5/2012 | Kirchberger et al. .......... | 33/1 PT |
| 2012/0124849 A1* | 5/2012 | Hiller et al. .................... | 33/1 PT |

FOREIGN PATENT DOCUMENTS

| | | |
|---|---|---|
| DE | 196 21 015 C2 | 7/1999 |
| GB | 2 313 442 A | 11/1997 |

* cited by examiner

*Primary Examiner* — Yaritza Guadalupe-McCall
(74) *Attorney, Agent, or Firm* — McGlew and Tuttle, P.C.

(57) ABSTRACT

An incremental transducer (1) as well as a process (D1) are provided for determining an actual position of a body (5) along a measuring path (W) and/or a change therein. A position code (7) of the incremental transducer (1) has a gap (10). To make it possible to use the incremental transducer (1) as flexibly as possible and to operate it despite dimensional tolerances of the body (5), provisions are made for converting an actual location frequency (Fi) of the position code (7) into a desired location frequency (Fs) that is independent from the length (L) of the gap (10) to generate a position signal (S) representative of the actual position or the change therein.

15 Claims, 8 Drawing Sheets

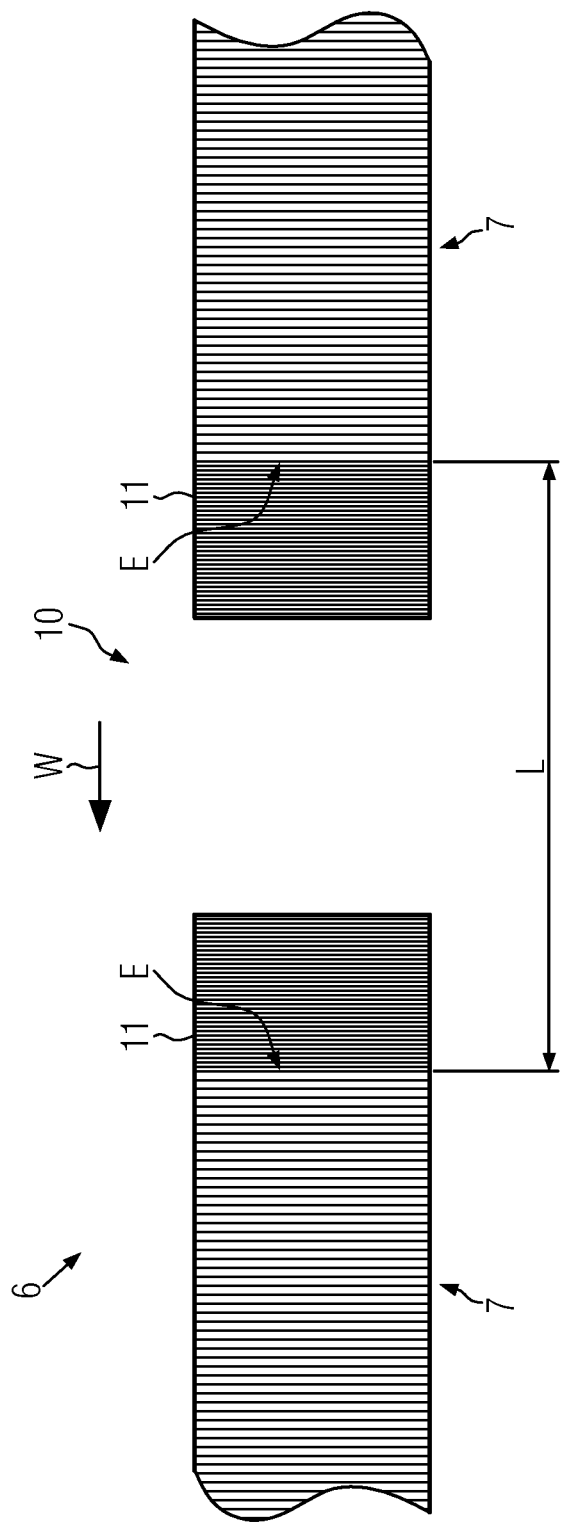

PROCESS AND INCREMENTAL TRANSDUCER FOR DETERMINING AN ACTUAL POSITION OF A BODY ALONG A MEASURING PATH OF A MATERIAL MEASURE HAVING AT LEAST ONE GAP

CROSS REFERENCE TO RELATED APPLICATIONS

This application claims the benefit of priority under 35 U.S.C. §119 of German Patent Application DE 102010061738.5 filed Nov. 22, 2010, the entire contents of which are incorporated herein by reference.

FIELD OF THE INVENTION

The present invention pertains to a process for determining an actual position of a body along a measuring path and/or a change therein, in which a position code having at least one gap is scanned with a plurality of position markers arranged along the measuring path with a predetermined actual location frequency and a position signal representative of the actual position and/or the change therein is generated.

Furthermore, the present invention pertains to an incremental transducer for determining an actual position of a body along a measuring path and/or the change therein, wherein the incremental transducer sends a position signal representative of the actual position and/or the change therein during the operation, with at least one material measure or measured material element, which extends along the measuring path and which is interrupted by at least one gap and is provided with a position code having a plurality of position markers, wherein the position markers are arranged along the measuring path with a predetermined actual location frequency, and with at least two sensor arrays arranged at spaced locations from one another along the measuring path for scanning the position code, of which at least one is always arranged outside the gap during the operation.

Furthermore, the present invention pertains to a measured material element that can be arranged along a measuring path for an incremental transducer, with a position code, which has a plurality of position markers arranged along the measured material element with a predetermined actual location frequency, wherein the measured material element is interrupted by at least one gap during the operation of the incremental transducer.

BACKGROUND OF THE INVENTION

Processes and incremental transducers as well as measured material elements for incremental transducers for determining actual positions of a body along a measuring path and/or the change therein are generally known. They are frequently used, for example, to monitor and control mechanical motion processes. For example, DE 196 21 015 C2 shows a device for detecting the position of moving machine parts, whose measured material element is composed of a plurality of timing lineals. Furthermore, incremental transducers are used to detect the rpm (speed) of and to control motors.

Incremental transducers differ from absolute value transducers in that they make available actual positions or changes in the actual position of a body only relative to an initial position at a starting intersection. The distance from the initial position is often determined on the basis of a number of position markers arranged between the initial position and the actual position. Absolute value transducers can determine the position, as the name implies, in absolute terms, i.e., not only relative to a starting position. The absolute position is preferably coded directly in the position code of the measured material element.

Prior-art measured material elements are not practical especially for the determination of the actual position and/or of the change in the actual position of large bodies, for example, a shaft of a wind power plant. Measured material elements have hitherto been adapted to the dimensions of the body to be monitored and often mounted in a closed form at the body. Consequently, the prior-art measured material elements are at times very large and can be manufactured and mounted at a high cost only.

Pre-assembled measured material elements cannot frequently be used, because dimensional imperfections of the body cannot be readily compensated with such a measured material element. For example, the diameter of the shaft of the wind power plant may deviate by up to 1 mm or more from a desired value. A measured material element manufactured in respect to the desired value can be mounted on such a shaft with difficulty only if at all.

Measured material elements are also difficult to manufacture for irregular measuring paths. To establish, for example, motions of the body along a measuring path that is composed of translatory and/or rotator motions, a corresponding measured material element, which is possibly of an irregular shape, must be manufactured. However, the manufacture of such a measured material element is very susceptible to dimensional tolerances.

If measured material elements are adapted to bodies having greater dimensional tolerances, while the actual location frequency of the position markers remains unchanged, the measuring resolution expected by a downstream electronic system may not possibly be offered by the incremental transducer having the assembled measured material element. Furthermore, such an incremental transducer cannot deal with changes in the dimensions of the body that occur during the lifecycle of the incremental transducer.

SUMMARY OF THE INVENTION

The object of the present invention is therefore to imp\*rove the prior-art incremental transducers such that they can be used in a flexible manner and can deliver the signals expected by the downstream electronic system.

The object is accomplished for the process mentioned in the introduction by the actual location frequency being converted into a desired location frequency that is independent from the length of the gap to generate the position signal.

The object is accomplished for the incremental transducer mentioned in the introduction by a conversion unit, by which the actual location frequency scanned by the sensor arrays can be converted into a desired location frequency.

The object is accomplished for the measured material element mentioned in the introduction by a connection device for the captive connection of ends of the measured material element adjoining the gap with one another, wherein the connection device is designed such that it is elastically compliant at least partly along the measured material element in a state in which it is connected to the ends.

The solution according to the present invention is characterized by simple design and has the advantage that dimensional tolerances of the body to be monitored as well as changes in dimensions are mechanically compensated by the measured material element during the operation of the incremental transducer and these tolerances or changes are absorbed by a change in the length of the gap. Changes caused by this in the sensor signals generated by the arrangements are absorbed by the conversion of the actual into the desired location frequency. Independently from the length of the gap and also in case of a change in length, the incremental transducer can deliver a position signal with the expected desired location frequency to the downstream electronic system. The position signal may be a rectangular or sine signal, a single-channel or multichannel signal or a signal representing a digitally coded incremental position or a signal derived directly from these, for example, by time differentiation or integration.

The actual location frequency may be the possibly locally variable frequency of the arrangement of the position markers along the measured material element or a, for example, interpolated multiple (factor greater or smaller than 1) of this frequency, and the position markers may be arranged at different frequencies, which differ from each other, along the measuring path. To improve the measuring accuracy of the incremental transducer, measured signals derived from the position markers may be sent to a calculation step and a signal can be generated hereby, whose actual location frequency is greater than the frequency with which the position markers are arranged along the measuring path. The increased actual location frequency represents here interpolated position markers, which are arranged along the measured material element at more closely spaced locations from one another than are the position markers of the measured material element. The actual location frequency and the desired location frequency may, as a rule, differ from one another.

With the conversion from the actual location frequency into the desired location frequency, the solution according to the present invention differs from the device according to DE 196 21 015 C2, in which the actual location frequency is always outputted unchanged and no frequency change is possible.

The solution according to the present invention can be further improved by various embodiments, which are advantageous per se and can be advantageously combined with one another in an advantageous manner. These embodiments and the advantages associated with them will be dealt with below.

Thus, a predetermined section of the measuring path, which contains at least one gap, can be scanned, in a variant of the process for generating the position signal, and the length of the section including the gap can be determined in actual periods of the position markers arranged with the actual location frequency or with interpolated position markers. The actual location period can consequently correspond to the shortest interval in space, in which the position markers are arranged recurrently along the measuring path or the measured material element, wherein the position markers of the measured material element or the interpolated position markers can be designated with the term position marker. One actual location period each can be proportional to the reciprocal value of the actual location frequency.

The length of the gap in actual location periods can be determined by a scanning of the position code outside the gap. The sensor arrays are arranged for this along the measuring path at such spaced locations from one another that at least one of the sensor arrays is always arranged outside the gap and can scan the position code.

To make it possible to generate the position signal at the beginning of the operation, the section can be scanned when the incremental transducer is put into operation prior to the regular operation thereof and the length of the section can be determined. To make it possible to at least recognize changes in the length of the measuring path and changes in the length of the gap that result herefrom during the operation, the length of the section can also be determined during the operation.

For example, the length of the section can be determined at selected intervals or in selected states of operation. To make it possible to guarantee as continuous a monitoring of the length of the gap as possible, the length of the section can be determined, as an alternative, during the ongoing operation of the incremental transducer.

To make it possible to carry out the most accurate possible conversion of the actual location frequency, it may be advantageous to use the largest possible quantity of actual location periods. The section can therefore comprise the overall length of the measuring path including the gap and a total number of position markers that can be arranged along the measuring path or of actual location periods can be determined. A simple continuous monitoring of the length of the measuring path can thus likewise be embodied especially when using incremental transducers with shafts rotating essentially continuously in one direction, for example, the drive shafts of wind power plants. The overall length of the measuring path can also be determined in actual location periods and used to generate the position signal even if the direction of motion of the body sporadically changes during the operation but it passes over the entire measuring path at least from time to time.

To generate the position signal, the number of actual location periods can be compared with a desired quantity of desired location periods and a conversion rule can be determined from this for the actual location frequency. Consequently, a conversion rule can be generated, which takes into account a change in the quantity of actual location periods, which is caused, for example, by changes in length, so that the downstream electronic system receives the position signal with the expected desired location frequency or desired resolution. The conversion rule can be consequently adapted to the length of the gap along the measuring path.

For example, a downstream electronic system of the incremental transducer can expect 1,024 desired location periods per 360° revolution of a shaft, which can correspond to 1,024 increments, e.g., pulses or flanks in the position signal, per revolution of the shaft. If the measured material element has in turn 1,024 position markers and if the gap has a length of 100 actual location periods, the incremental transducer would send 1,124 increments per 360° revolution to the downstream electronic system without conversion of the actual location frequency into desired location frequency. The downstream electronic system would interpret the 100 excess position markers or increments as a further rotation of the shaft, which can lead to malfunction, for example, of the wind power plant. Such a malfunction may be that rotor blades are not arranged in the intended position.

To generate the position signal, the number of actual location periods can be compared with a desired number of desired location periods and the conversion rule can be determined from this for the actual location frequency. For example, the total number of actual location periods can be divided by the number of desired location periods present in the desired quantity and a conversion factor can be determined from this for the actual location frequency. The gap or a selected site of the gap, for example, the end thereof, can be used to mark the beginning and the end of the measuring path.

In order for the incremental transducer to be able to carry out the conversion rule itself, at least one sensor signal with the actual location frequency of at least one of the two sensor arrays can be sent, during the operation, on the input side of the conversion unit. An output signal, in which the desired location frequency derived from the actual location frequency is contained, may be present at a signal output of the conversion unit.

The position code may be interrupted by the gap. To guarantee that the sensor array, which scans the position code outside the gap, is always used to generate the position signal, areas of the gap adjoining the position code may be formed with an end position code differing from the position code. If one of the sensor arrays reaches the end position code, the incremental transducer can switch over from the sensor array currently scanning the position code to the respective other sensor array. Disturbances possibly occurring due to an abrupt end of the position code during the switching over of the sensor arrays are thus avoided.

The end position code can be designed such that the sensor signals generated by the sensor arrays during the scanning of the end position code can be distinguished from those generated during the scanning of the position code. For example, the end position code may have end position markers, which are arranged along the measuring path at an actual location frequency different from the actual location frequency of the position code. This location frequency of the end position markers may be, for example, greater than and especially twice the actual location frequency.

To make it possible to guarantee smooth operation of the incremental transducer, the measured material element should be arranged essentially captively at the body. However, it is often disadvantageous if the measured material element is welded to the body or is detachably fixed thereto in another manner. Arranging fastening members on the body may also be disadvantageous. For example, no holes for mounting fastening screws for the measured material element must be regularly provided in rotating bodies. End pieces of the measured material element adjoining the gap can be captively connected to one another in order to nevertheless make it possible to connect the measured material element essentially nondisplaceably to the body. The connection device may be designed such that it is elastically compliant at least partly along the measuring path and it can exert a tensile force on the ends. This elastic tensile force can span the measured material element, which may be especially of a strip-shaped design, around the body and thus generate a frictionally engaged connection between the measured material element and the body. The use of separate fastening members between the measured material element and the body is not necessary.

Another advantage of the elastically compliant connection device is that the connection device can also compensate heat-induced mechanical stresses in the measured material element mounted along the measuring path. If, for example, the position of a shaft of the wind power plant is to be determined, the diameter of the shaft may change in the annual cycle, because the shaft may be exposed to ambient temperatures of up to 60° C. or higher in the summer and to below −40° C. in the winter. Heat generated during the operation of the wind power plant may, moreover, cause the temperature of the shaft to rise to 40° C. even at an ambient temperature of −30° C. The shaft may consequently expand or contract considerably during the operation. As a result, the length of the measuring path, which may extend along the circumference of the shaft, may thus deviate markedly from the desired value and change even during the operation. However, the measured material element is always firmly in contact with the shaft due to the use of the incremental transducer according to the present invention, and the downstream electronic system receives position signals with the expected desired location frequency over the entire year. A change in the length of the gap does not affect either the fastening of the measured material element or the position signal.

The last known conversion rule can be used to make it possible to send the expected desired location frequency to the downstream electronic system already at the start of the incremental transducer, i.e., already before the first determination of the conversion rule of the current operating period of the incremental transducer. However, miscalculation of the actual location frequency may occur in case of such a procedure. For example, the last known conversion rule may have been determined at a shaft temperature of 40° C. The shaft may have cooled, for example, by 60° C. to a temperature of −20° C. since the end of this operating period and shrunk correspondingly. The last known conversion rule would consequently lead to incorrect results. Consequently, it may be advantageous to use other known conversion rules at the start of the incremental transducer. It would be possible, for example, to use known conversion rules determined shortly after previous starts directly or, for example, in an averaged manner. Furthermore, the current shaft temperature can be used to select known conversion rules. The incremental transducer can consequently always predict the conversion rule to be used at the start more accurately after a longer operation and especially after several operating periods.

For proper operation of the incremental transducer, the connection device may be arranged outside a collision area of the at least two sensors. Especially holding elements of an elastically compliant design may be designed in the form of holding clamps, which flank the measuring path on two sides and which may be formed elastically along a middle part. Sensor arrays passing over the holding clamps along the measuring path do not touch these holding clamps.

The present invention will be explained below as an example on the basis of exemplary embodiments with reference to the drawings. The different features of the embodiments may be combined independently from one another, as was already explained in connection with the individual advantageous embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a schematic view of an exemplary embodiment of a measured material element according to the present invention;

DESCRIPTION OF THE PREFERRED EMBODIMENTS

Figure 1:
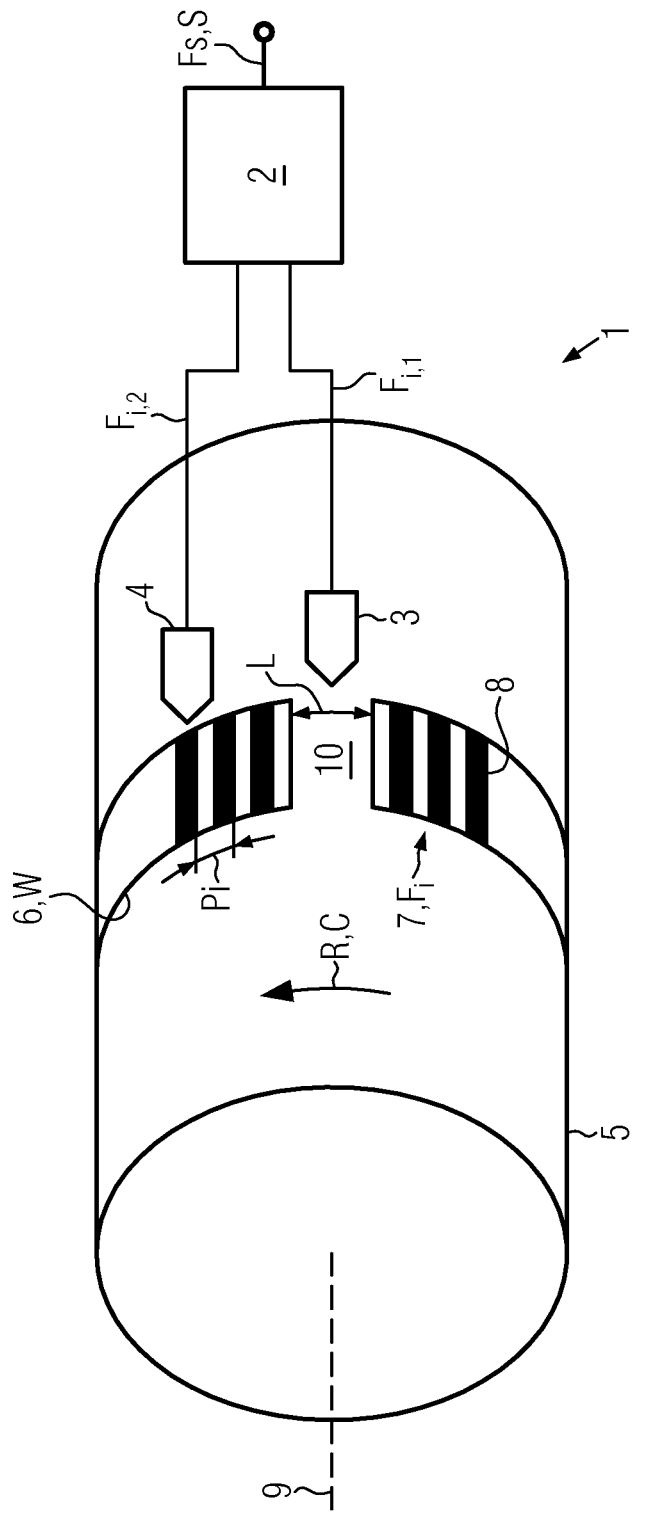
FIG. 1 is a schematic view of a first exemplary embodiment of the incremental transducer according to the present invention with a shaft, whose position shall be determined.

Referring to the drawings in particular, the design and function of an incremental transducer 1 will be described first with reference to the exemplary embodiment according to FIG. 1. The incremental transducer 1 may have a conversion unit 2, which may be connected to a first and second sensor array 3, 4 on the input side. The sensor arrays 3, 4 may scan a measured material element 6 arranged nondisplaceably at a body 5 along a measuring path W. The measured material element 6 may have a position code 7 of a plurality of position markers 8. A selection of position markers 8 is shown in the exemplary embodiment shown schematically as bold bars extending at right angles to the measured material element 6. The position markers 8 may be located at a constant distance from adjacent position markers 8 and may be arranged recurringly at this distance, which may also be called actual location period $P_i$. The position markers 8 may consequently be arranged along the measured material element 6 with a preset and especially constant actual location frequency $F_i$. The position markers 8 arranged with the actual location frequency $F_i$ may consequently occur recurringly with the actual location frequency $P_i$ along the measured material element 6, and the actual location period $P_i$ may correspond to the reciprocal value of the actual location frequency $F_i$.

In the exemplary embodiment according to FIG. 1, body 5 comprises a shaft, which is designed such that it can be rotated about an axis of rotation 9. If, for example, body 5 is rotated in a direction R, the measured material element 6 is moved past the sensor arrays 3, 4 in this direction R. To measure the speed of rotation of body 5, the measured material element 6 may be arranged along the measuring path W extending along a circumferential direction C in the exemplary embodiment being shown. The length of the measuring path W may correspond to the circumference of the shaft 5 in the exemplary embodiment being shown. The incremental transducer 1 according to the present invention may, of course, be used with other shafts, hubs or bodies 5 having a different shape and possibly performing not only rotary motion as well. The measured material element 6 may be arranged along the measuring path W, and the measuring path W may also include translatory motion or combinations of such motions of the body 5 besides rotary motions.

It may happen in practice that the length of the measuring path W can be determined only inaccurately or that the length of the measuring path W may change. Accurate determination of the length of the measuring path W may be difficult, for example, in case of bodies 5 having large dimensions. In addition, it may happen that the measured material element 6 shall be arranged at a body 5, which is already installed in an industrial plant. It may be difficult to determine the dimension of the body 5 in this case as well. Such a body 5 may be designed, for example, as a shaft for a wind power plant, wherein the shaft can connect a rotor of the wind power plant to the generator thereof. Such shafts may definitely have diameters larger than one meter. Furthermore, bodies 5 are often exposed to great temperature fluctuations during operation. For example, the ambient temperatures of shafts installed in wind power plants may vary between −40° C. and +60° C. during the operation and over the year. Due to these thermal fluctuations, the shafts expand and contract, so that the circumference thereof changes over the year.

To make it possible to nevertheless mount the measured material element 6 and to operate the incremental transducer 1 safely on a continuous basis despite the possible dimensioning inaccuracy and changes in the dimensions of the body 5, the measured material element 6 may be arranged at the body 5 with a gap 10. A length L of gap 10 may be determined here by the dimensional tolerances of the body 5 or by the dimensions of the body 5, which change over time. Consequently, the gap L may be greater at high ambient temperatures than at low temperatures.

Gap 10 may be bridged over with a connection device, which is made elastic along the measuring path W and which can connect sections of the measured material element 6 that adjoin the gap 10 to one another. Exemplary embodiments of such a connection device are shown in FIGS. 6 through 9.

If the position code 7 is moved past the sensor arrays 3, 4, the sensor arrays 3, 4 generate a sensor signal $F_{i,1}$, $F_{i,2}$ each, in which the actual location frequency $F_i$ of the position markers 8 is contained. The sensor arrays 3, 4 may be arranged along the measuring path W such that one of the sensor arrays 3, 4 is always arranged outside the gap 10 and at least one of the signals $F_{i,1,2}$ can be transmitted to the conversion unit 2. The actual location frequency $F_i$ can be converted into a desired location frequency $F_s$ in the conversion unit 2. The desired location frequency $F_s$ can be reset such that a position signal S sent by the incremental transducer 1 for the entire measuring path W contains a predetermined quantity of increments. This predetermined quantity of increments may be independent from the size of the gap 10. For example, the incremental transducer 1 may send 1,024 increments per a 360° rotation of the shaft-shaped body 5. The measured material element 6 may likewise have 1,024 actual location periods $P_i$. The length L of the gap 10 may equal about 200 actual location periods $P_i$, so that 1,224 actual location periods $P_i$ are scanned (passed over) by the sensor arrays 3, 4 per complete rotation of the body 5. If the total number of actual location periods $P_i$ is divided by the number of desired increments, a conversion factor is obtained for the actual location frequency $F_i$. The actual location frequency $F_i$ can be multiplied, for example, with the conversion factor in the conversion unit 2 to determine the desired location $F_s$.

To determine the direction of motion of body 5, each of the two sensor arrays 3, 4 may have two sensors each. These two sensors may be arranged at spaced locations from one another along the measuring path W such that one sends a sine signal and the other a cosine signal when it is moved relative to the measured material element 6 along the measuring path W. The incremental transducer 1 can thus also reliably determine the direction of motion of the body even if the possibly variable length L of the gap 10 should lead to phase shifts of the position code 7 relative to the sensor arrays 3, 4.

FIG. 2 shows another exemplary embodiment of the measured material element 6 according to the present invention in a schematic view. The position code 7 may extend along the measuring path W up to the gap 10, whose length L extends in parallel to the measuring path W. Within the gap 10, an end position code 11 each adjoins the ends E of the position code 7, which ends adjoin the gap 10. If one of the sensor arrays 3, 4 reaches one of the end position codes 11, the incremental transducer 1 can switch over to the respective other sensor array 4, 3 and use the signal thereof to determine the position signal S. The end position code 11 may have a code differing from the position code 7. For example, position markers 8 provided in the area of the end position code 11 may be arranged with a location frequency different from that in the position code 7. The end position code 11 can be coded such that signals generated by the sensor arrays 3, 4 differ from the sensor signals $F_{i,1,2}$ and have, for example, a lower amplitude than the sensor signals of position code 7. The location frequency can be, for example, increased and especially doubled for this within the end position code 11 compared to the actual location frequency $F_i$.

The measured material element 6 has a strip-shaped design in the exemplary embodiment being shown, and the end position codes 11 are arranged each in the area of one of the ends of the strip, which said ends protrude into the gap 10.

Figure 3:
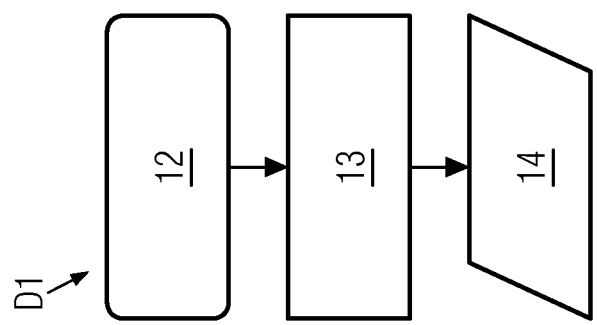
FIG. 3 is a schematic view of an aspect of a process according to the present invention for determining an actual position of a body.

FIG. 3 shows a first exemplary embodiment of the process D1 according to the present invention for determining the actual position of body 5. The same reference numbers will be used for elements that correspond to the elements of the previous exemplary embodiments in terms of function and/or design. Only the differences from the exemplary embodiments shown in the figures will be dealt with for the sake of brevity.

The actual location frequency $F_i$ can be determined in a first process step 12. For example, the actual location frequency $F_i$ can be determined from one of the sensor signals $F_{i,1,2}$ generated by the sensor arrays 3, 4. The desired location frequency $F_s$ for the position signal S can be calculated as a function of the actual location frequency $F_i$ in a step 13 following step 12. The actual location frequency $F_i$ can be linked for this, for example, according to a conversion rule, with a conversion factor. The conversion rule can be adapted to the length of the gap 10 and the conversion factor can depend on a total quantity of actual location period $P_i$ that can be arranged along the entire measuring path W and a reset quantity of desired increments. The quantity of desired increments can be expected, for example, by a control computer arranged downstream of the incremental transducer 1 per complete scanning of the measuring path W. For example, the control computer can expect 100,000 desired increments per complete rotation of the shaft. Since the actual location frequency $F_i$ may not be able to be readily obtained from the sensor signals $F_{i,1,2}$, the conversion step 13 may also be applied to a frequency that depends on the velocity of motion of the body 5 and is contained in the sensor signals $F_{i,1,2}$.

The position signal S may be a rectangular or sine signal, a single-channel or multichannel signal or a signal representing a digitally coded incremental position or a signal derived directly from these, for example, by time differentiation or integration.

In a process step 14 following step 13, the position signal S can be sent, and the position signal S may contain at least the desired location frequency $F_s$ or a time frequency that depends on the desired location frequency $F_s$ and the velocity of motion of body 5. The desired location frequency $F_s$ may differ from the actual location frequency $F_i$.

Figure 4:
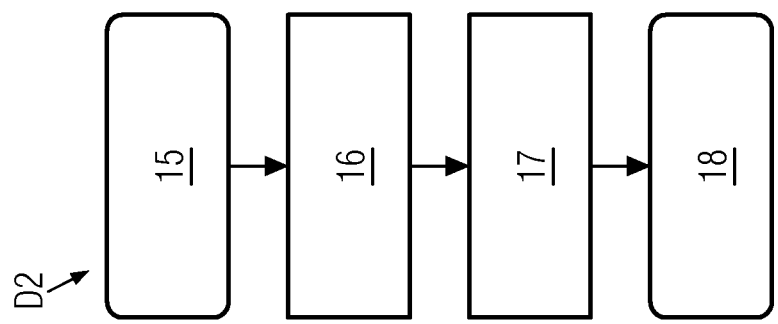
FIG. 4 is a schematic view of an aspect of a process according to the present invention for determining an actual position of a body.

FIG. 4 shows an exemplary embodiment of a process D2 according to the present invention, wherein the same reference numbers are used for elements that correspond in terms of function and/or design to the elements of the exemplary embodiments of the previous figures. Only the differences from the exemplary embodiments of the previous figures will be dealt with for the sake of brevity.

FIG. 4 shows an exemplary embodiment of a process D2 for determining the conversion factor for process step 13 of the exemplary embodiment according to FIG. 3. A section of the measured material element 6 can be scanned at first in a step 15. In particular, the section may comprise the gap 10 and the measuring path W may be possibly scanned completely. For example, the measuring path W can be scanned continuously during the operation in case of a shaft of a wind power plant, which is rotating essentially constantly in one direction.

The total number of all actual location periods $P_i$ that can be arranged along the section can be counted in a step 16 following the process step 15. To determine the length of this section in actual location periods $P_i$, the actual location periods $P_i$, which can be arranged along the section, can be counted. To determine the actual location periods $P_i$ fitting into the gap 10, a section of the position code 7 corresponding to the length L of the gap 10 can be scanned. The start and the end of the gap 10 can be recognized by one of the sensor arrays 3, 4 on the basis of the end position code 11. The other sensor array 4, 3 can scan the position code 7, whereas the sensor array 3, 4 is arranged within the gap 10.

The number of actual location periods P counted can be compared with a number of desired increments in the next process step 17. For example, the number of actual location periods $P_i$ can be divided by the number of desired increments and a conversion factor can be determined from this for the actual location frequency $F_i$.

The conversion factor can be made available to the process according to FIG. 3 in the next process step 18. The process according to FIG. 4 can be determined now in training runs started to determine the conversion factor, in selected operating states or continuously during the operation of the incremental transducer 1.

Figure 5:
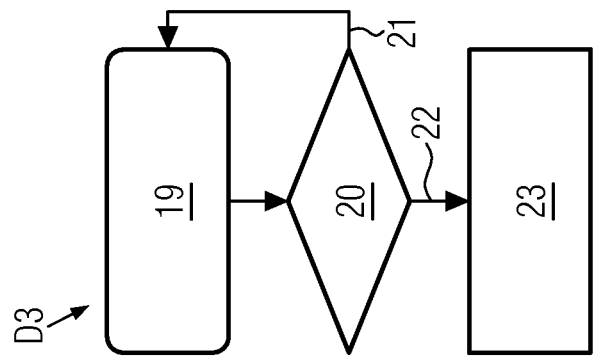
FIG. 5 is a schematic view of an aspect of a according to the present invention for determining an actual position of a body.

FIG. 5 shows an exemplary embodiment of a partial process D3, in which the same reference numbers are used for elements that correspond in terms of function and/or design to the elements of the exemplary embodiments of the previous figures. Only the differences from the exemplary embodiments of the previous figures will be dealt with for the sake of brevity.

FIG. 5 schematically shows how switching over is performed between the sensor arrays 3, 4.

One of the sensor arrays 3, 4 and, for example, the first sensor array 3 can be polled or the sensor signal $F_{i,1,2}$ thereof can be analyzed in process step 19. It can be determined in the next process step whether, for example, the sensor array 3 has reached one of the end position codes 11. The signal generated on the basis of the end position code 11 can be distinguished from the sensor signal $F_{i,1,2}$ generated on the basis of the position code 7. These differences in the sensor signal $F_{i,1,2}$, for example, a changed amplitude, can be automatically recognized by the incremental transducer 1. Based on the change of the signal, the incremental transducer 1 can decide automatically which of the sensor arrays 3, 4 shall be used to generate the position signal S.

The case in which the polled sensor array 3, 4 has not reached the end position code 11 is shown in branch 21. The sensor array 3, 4 polled to generate the position signal S is not changed. For example, the sensor array 3 can poll the position code 7 in this branch 21 and continue to be used. Should the sensor array 3 be arranged within the gap 10, which has no code, the respective other sensor array 4 may continue to be polled.

The sensor array 3, 4 just polled reaches the end position code 11 in branch 22. Consequently, it is possible to switch over the respective other sensor array 4, 3 in step 23.

Figure 6:
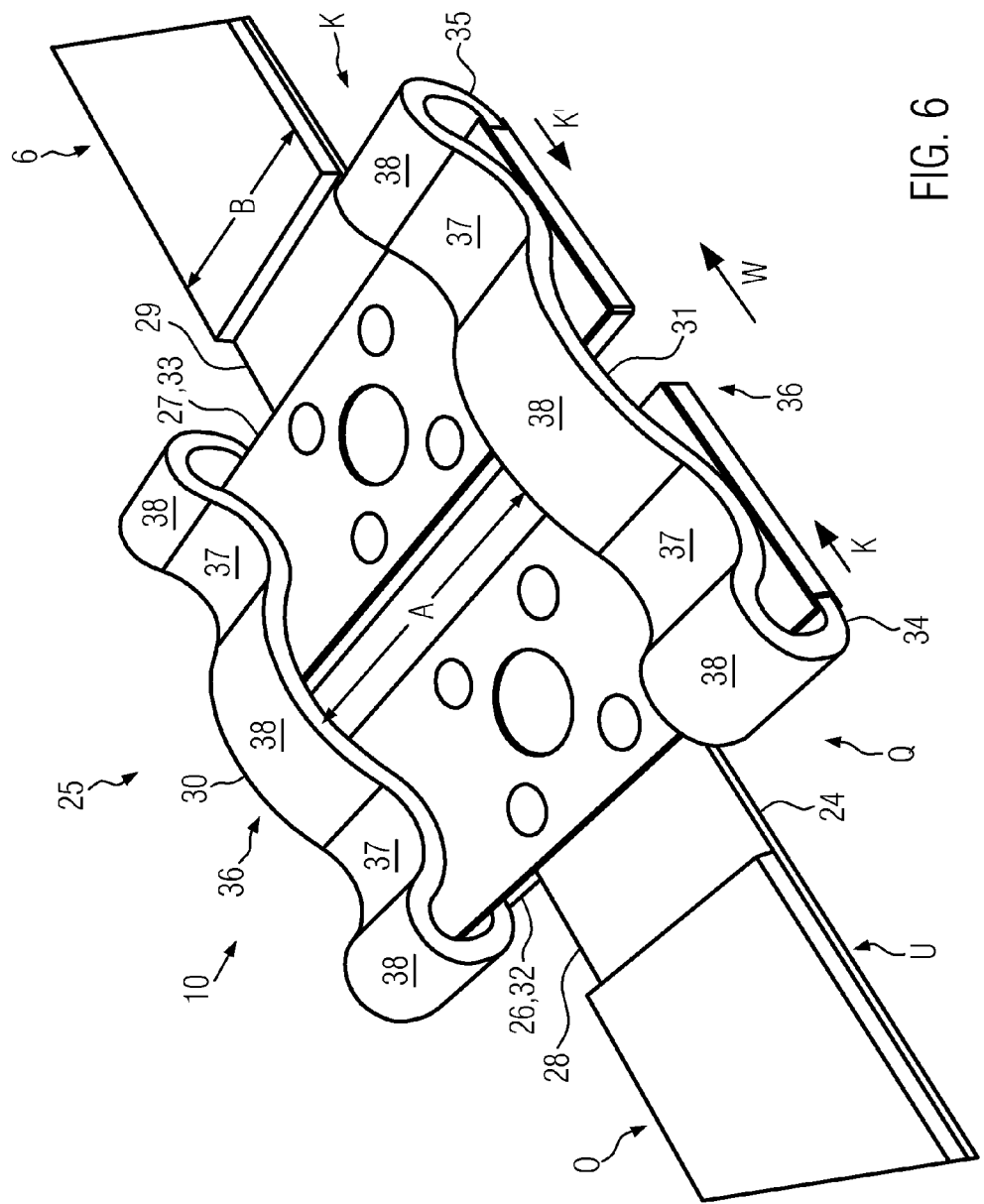
FIG. 6 is a schematic view of another exemplary embodiment of the measured material element according to the present invention.

FIG. 6 shows a first exemplary embodiment of the measured material element 6 according to the present invention with a connection device. The same reference numbers are used for elements that correspond in terms of function and/or design to the elements of the exemplary embodiments according to the previous figures. Only the differences from the exemplary embodiments of the previous figures will be dealt with for the sake of brevity.

The measured material element 6 is arranged on a carrier strip 24, which may be designed, for example, as a stainless steel strip. The measured material element 6 and the carrier strip 24 may be connected nondisplaceably to one another. The carrier strip 24 may protrude over the measured material element 6 in the direction of the gap 10 and thus be available as a connection element for a connection device 25.

The connection device 25 may comprise fastening elements 26, 27 that can be fixed to the carrier strip 24. The fastening elements 26, 27 may be fixed, for example, to ends 28, 29 of the carrier strip 25, which protrude into the gap 10. For example, the fastening elements 26, 27 may be welded to the carrier strip 24.

The fastening elements 26, 27 may rise above the measured material element 6 or the carrier strip 24 in the fixed state at right angles to the measured material element 6 or even at right angles to the measuring path W and be designed, for example, as fastening plates 26, 27. The ends 28, 29 of the carrier strip 24 may form a T-shaped fastening anchor Q each together with the fastening elements 26, 27.

The fastening plates 26, 27 may have a shape complementary to the ends 28, 29 of the carrier strip 24 at least in some sections. For example, the fastening elements 26, 27 may be formed with mounts for the ends 28, 29. If the ends 28, 29 are connected to the fastening elements 26, 27, an underside U of the measured material element 6 and of the connection device 25 may form essentially a continuous surface. On a top side O of the measured material element 6 located opposite the underside U, the fastening elements 26, 27 do not rise above the measured material element 6.

The connection device 25 may have two holding elements 30, 31, which may be captively connected to the fastening elements 26, 27. Each of the holding elements 30, 31 may now connect the two fastening elements 26, 27 to one another such that the fastening elements 26, 27 are movable relative to one another in an elastically compliant manner by certain amounts only along the measured material element 6 or in parallel to the measuring path W. The holding elements 30, 31 may be designed, for example, as elastically compliant holding clamps, whose spring forces K, K' act on sides 32, 33 of pointing away from the gap 10 on the fastening elements 26, 27 and can force these towards each other. Free ends 34, 35 of the holding elements 30, 31 may be directed such that they point towards each other. In a middle section arranged between the free ends 34, 35, the holding elements 30, 31 may be provided with an elastic wave structure 36, wherein the holding elements 30, 31 are provided in the exemplary embodiment being shown with a wave structure 36, which comprises two valleys 37 and three peaks 38 arranged around the valleys 37. The free ends 34, 35 may be arranged in an S-shaped structure together with the adjacent peaks 38 and valleys 37.

The holding elements 30, 31 may be arranged at spaced locations from one another crosswise to the measuring path W and at right angles to the measured material element 6. A distance A between the holding elements 30, 31 may be selected to be such that the holding elements 30, 31 are arranged outside a collision area of the sensor arrays 3, 4. For example, distance A may correspond at least to a width B of the measured material element 6.

The measured material element 6 or the carrier strip 24 thereof can be braced along the measuring path W by the elastic holding elements 30, 31. If the measuring path W extends, for example, around the body 5 designed as a shaft, the measured material element 6 can be in contact braced by the spring forces K, K' along a jacket surface of body 5. The measured material element 6 can be pressed by the spring forces K, K' nondisplaceably against the body 5.

Figure 7:
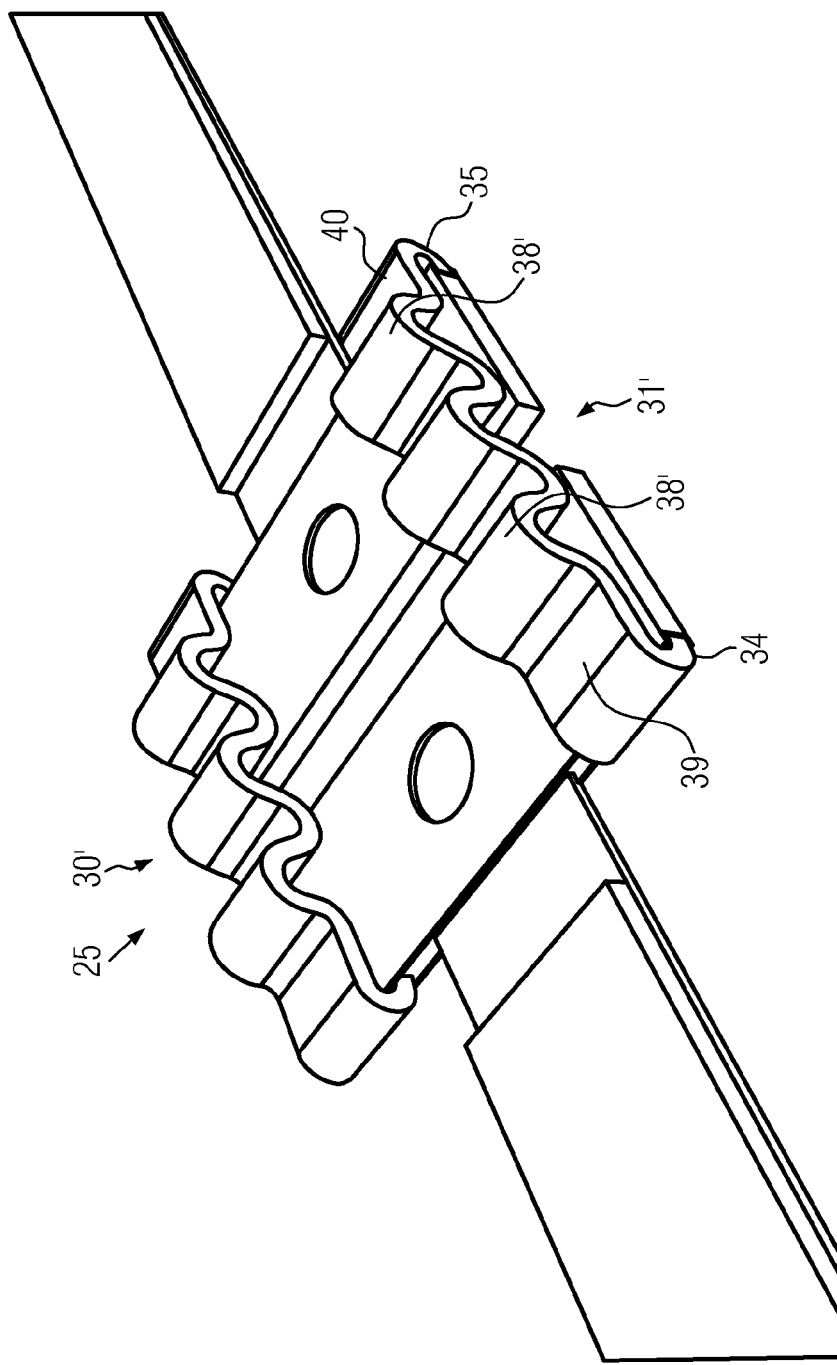
FIG. 7 is a schematic perspective view of another exemplary embodiment of the measured material element according to the present invention in one of different views.

FIG. 7 shows the measured material element 6 according to the present invention with another exemplary embodiment of the connection device 25. The same reference numbers are used for elements that correspond in terms of function and/or design to the elements of the exemplary embodiments according to the previous figures. Only the differences from the exemplary embodiments of the previous figures will be dealt with for the sake of brevity.

FIG. 7 shows the connection device 25 with holding elements 30', 31', whose outer peaks 38' do not end, as in the exemplary embodiment according to FIG. 6, at the free ends 34, 35. The outer peaks 38' rather pass over into the free ends 34, 35 via sections 39, 40 extending in parallel to the measured material element 6. The free ends 34, 35 and the sections 39, 40 extending in parallel to the measured material element 6 are essentially J-shaped, the sections 39, 40 forming the long sides of the J.

Figure 8:
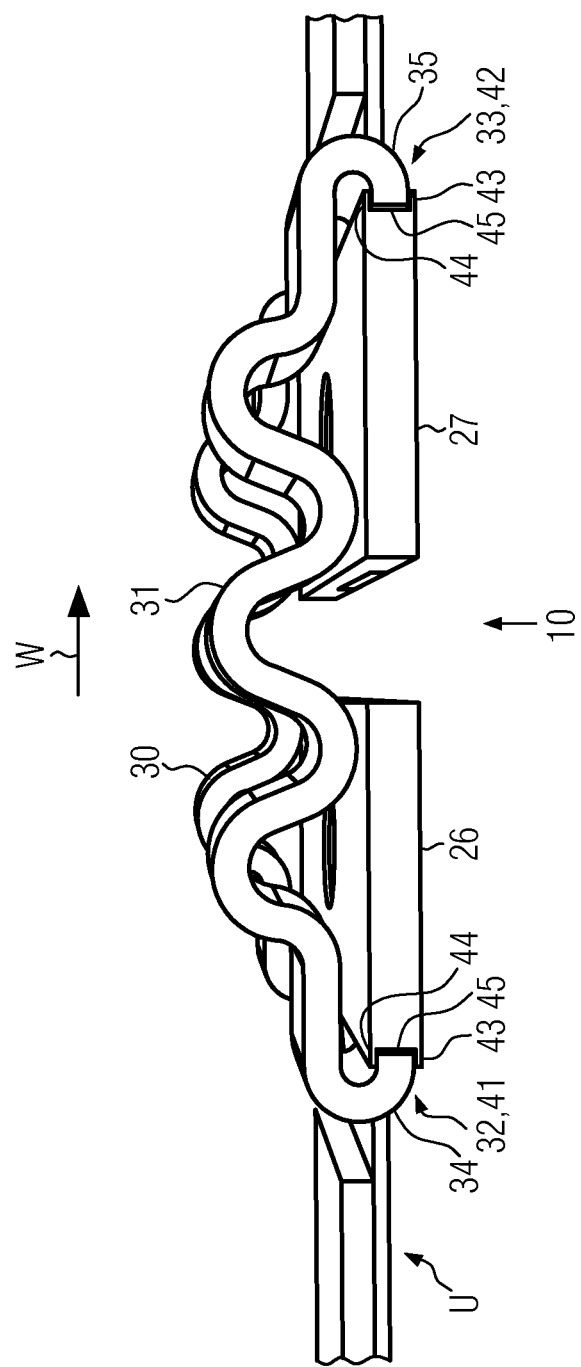
FIG. 8 is a schematic perspective view of another exemplary embodiment of the measured material element according to the present invention in another of different views.

FIG. 8 shows the exemplary embodiment according to FIG. 7 in a schematic side view.

The fastening elements 26, 27 may be provided, as can be recognized especially clearly in this view, with holding grooves 41, 42 for the free ends 34, 35 of the holding elements 30, 31 at their sides 32, 33 pointing away from the gap 10. The holding grooves 41, 42 may point with their open sides away from the 10 and extend crosswise to the measuring path W or at right angles to the measured material element 6 along the fastening elements 26, 27. Cheeks 43, 44 may limit the grooves 41, 42 at right angles to the underside U of the measured material element 6. The cheeks 43, 44 can secure the position of the holding elements 30, 31 at right angles to the underside U against unintended displacements. The free ends 34, 35 of the holding elements 30, 31 can protrude in the mounted state of the measured material element 6 into the essentially U-shaped holding grooves 41, 42 and be in contact with the bottom 45 thereof.

Figure 9:
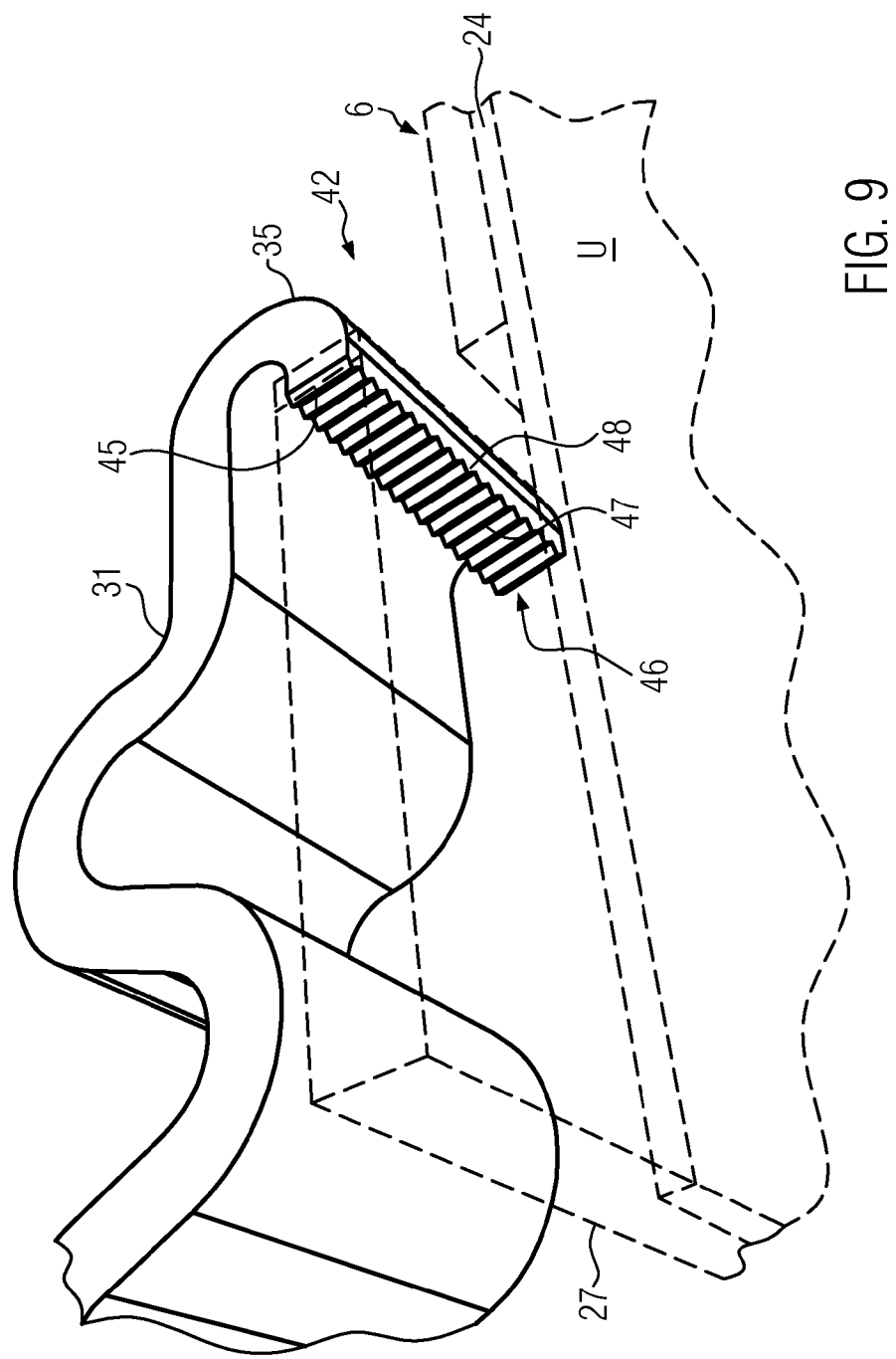
FIG. 9 is a schematic perspective view of another exemplary embodiment of the measured material element according to the present invention in another of different views.

FIG. 9 schematically shows the exemplary embodiment according to FIGS. 7 and 8 in a view towards the underside U of the measured material element 6. The measured material element 6 and one of the fastening elements 26, 27 are shown transparently and by broken lines.

The free end 35 protrudes into the holding groove 42 and can be connected thereto in a frictionally engaged manner, so that the holding elements 30, 31 can be secured hereby against accidental displacement along the holding grooves 41, 42. The free ends 34, 35, of which only the free end 35 is shown in FIG. 9, may be provided with a securing structure 46, by which the frictional engagement between the free ends 34, 35 and the fastening elements 26, 27 is intensified. For example, the securing structure 46 may be roughened and especially designed in a saw tooth pattern, so that peaks or edges of the securing structure 46 press against the bottom 45 of the holding grooves 41, 42. In particular, the securing structure 46 may be designed such that edges 47 pressed against the bottom 45 are arranged such that they extend at right angles to the respective holding groove 41, 42. The edges 47 may be assigned to saw tooth-shaped structures 48 of the securing structure 46.

Figure 10:
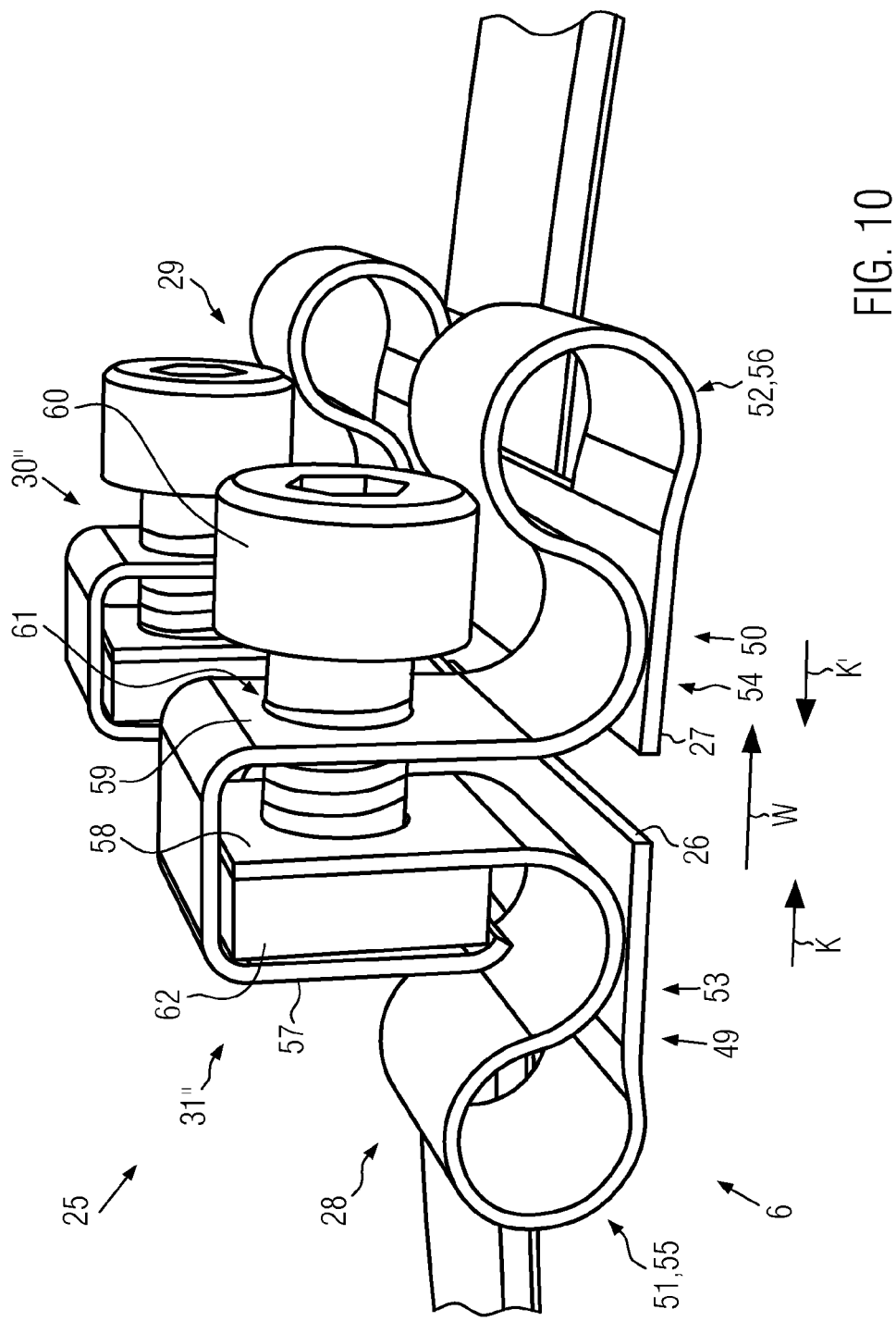
FIG. 10 is a schematic view of another exemplary embodiment of the measured material element according to the present invention.

FIG. 10 shows another embodiment of the measured material element 6 according to the present invention with a connection device 25. The same reference numbers are used for elements that correspond in terms of function and/or design to the elements of the exemplary embodiments according to the previous figures. Only the differences from the exemplary embodiments of the previous figures will be dealt with for the sake of brevity.

The holding elements 30", 31" may be of a two-piece design. For example, holding element 30" may be designed like holding element 31". Only the details of the embodiment of holding element 31" will be discussed here for simplicity's sake. The compensating means 49, 50 may be fastened each to one of the fastening elements 26, 27 made especially in one piece with the fastening elements 26, 27. Spring members 51, 52, which can apply the spring forces K, K' at least partly, may adjoin the fastening elements 26, 27. The spring members 51, 52 may be bay-shaped, wherein open 53, 54 of the bays 55, 56 formed by the members 51, 52 may point towards one another. Over their course away from the fastening elements 26, 27, the compensating means 49, 50 may have holding members 57, 58. The holding members 57, 58 may be designed such that they overlap each other in parallel to the measuring path W. For example, the holding members 57, 58 may extend at right angles to the measuring path W and be arranged one after another along the measuring path W. In particular, holding member 58 may be arranged between the holding member 57 and a stop element 59 arranged opposite the holding member 57. Stop element 59 may be part of the compensating means 50, like the holding member 57.

The holding members 57, 58 can be brought into the overlapping arrangement shown during the mounting of the measured material element 6. The holding members 57, 58 may consequently be hooked into one another and thus connect the ends 28, 29 of the measured material element 6 to one another.

To make it possible to secure the position of the compensating means 49, 50 in relation to one another, the connection device 25 may comprise at least one fixing member 60, which at least limits displacements of the compensating means 49, 50 relative to one another. For example, fixing member 60 may be designed as a screw, which can pass through an opening 61 extending in parallel to the measuring path W in the stop element 59. To connect the means 49, 50, the connection device 25 may have, furthermore, a second fixing member 62 interacting with the fixing member 60. For example, the second fixing member 60 may be designed as a screw nut, which can be screwed together with the screw-like fixing member 60. In particular, the second fixing member 62 may be in contact with a side 63 of the holding member 58 pointing away from the stop element 59 and fastened to the holding member 58 or, for example, bonded thereto. If the fixing members 60, 62 are connected to one another and, for example, screwed together, holding member 58 can be pressed with the stop element 59. As a result, the ends 28, 29 of the measured material element 6 can be fastened to one another optimally, with the members 51, 52 applying the spring forces K, K'.

The embodiment according to the present invention of the connection device 25 of the exemplary embodiment shown in FIG. 10 has, furthermore, the advantage that the value of the spring forces K, K' can be preset by the fixing members 60, 62. The screw-like fixing member 60 can thus be screwed into the screw nut-like second fixing member 62 only to the extent that the forces K, K' are brought about at the desired value. If the length of the measuring path W changes, the spring forces K, K' fluctuate by these preset spring forces.

While specific embodiments of the invention have been shown and described in detail to illustrate the application of the principles of the invention, it will be understood that the invention may be embodied otherwise without departing from such principles.

What is claimed is:

1. A process for determining an actual position of a body along a measuring path and/or a change in a position of the body along the measuring path, the process comprising the steps of:

scanning a position code having a plurality of position markers arranged with a predetermined actual location frequency and having at least one gap between ends of said position code;

generating a position signal representative of an actual position and/or a change in the actual position of the position code, wherein to generate the position signal, the actual location frequency is converted into a desired location frequency that is independent from a length of the gap.

2. A process in accordance with claim 1, wherein:

said position code with said plurality of position markers is arranged along a measured material element applied to the body with a connection device for connecting said ends of the measured material element adjoining the gap to one another, said connection device being elastically compliant at least partly along the measured material element in a state in which said connection device is captively connected to said ends; and to generate the position signal, a predetermined section of the measuring path, which section contains the at least one gap, is scanned and a length of the section including the gap is determined in actual location periods of the position markers arranged with the actual location frequency.

3. A process in accordance with claim 2, wherein the length of the section is determined during the operation.

4. A process in accordance with claim 2, wherein a part of the position code corresponding to the gap is scanned to determined the length of the gap.

5. A process in accordance with claim 2, wherein the overall length of the measuring path including the gap is determined as a total number of actual location periods.

6. A process in accordance with claim 2, wherein to generate the signal, the number of actual location periods is compared with a desired quantity of desired location periods and a conversion rule is determined therefrom for the actual location frequency.

7. An incremental transducer for determining an actual position of a body along a measuring path and/or a change in position of the body along the measuring path;

a measured material element, which extends along the measuring path and which is interrupted by at least one gap and is provided with a position code having a plurality of position markers arranged along the measuring path with a preset actual location frequency;

a position signal generator, of the incremental transducer that sends a position signal representative of the actual position and/or change in position of the body along the measuring path during an operation, including two sensor arrays for scanning the position code, said two sensor arrays being arranged at spaced locations from one another along the measuring path such that at least one of said two sensor arrays is always arranged outside of the gap during operation; and a conversion unit, by which the actual location frequency scanned by the two sensor arrays is converted into a desired location frequency.

8. An incremental transducer in accordance with claim 7, wherein:
- at least one sensor signal is fed, during the operation, to an input side of said conversion unit, with the actual location frequency of at least one of said two sensor arrays; and
- an output signal in which the desired location frequency, derived from the actual location frequency, is contained, is present at a signal output of said conversion unit.

9. An incremental transducer in accordance with claim 7, wherein the position markers are arranged along the measuring path with an actual location period that depends on the actual location frequency.

10. An incremental transducer in accordance with claim 7, wherein the position code is interrupted by the gap, and areas of the gap adjoining the position code are formed with an end position code differing from the position code.

11. An incremental transducer in accordance with claim 10, wherein the end position code has end position markers, which are arranged along the measuring path with a location frequency differing from said actual location frequency of the position code.

12. An incremental transducer in accordance with claim 7, further comprising a connection device wherein ends of the measured material element adjoining the gap are connected to one another captively by said connection device, wherein said connection device is made elastically compliant at least partly along the measuring path.

13. An incremental transducer in accordance with claim 12, wherein an elastic area of the connection device is designed such that the connection device compensates mechanical stresses caused by heat in the measured material element mounted along the measuring path.

14. An incremental transducer in accordance with claim 12, wherein the connection device is arranged outside a collision area of the at least two sensor arrays.

15. A measured material element that can be arranged along a measuring path for an incremental transducer, the measured material element comprising:
- a position code with a plurality of position markers arranged along the measured material element, the position markers having a preset actual location frequency, the measured material element having ends and being applied for operation of an incremental transducer with at least one gap between said ends;
- a connection device for connecting said ends of the measured material element adjoining the gap to one another, said connection device being elastically compliant at least partly along the measured material element in a state in which said connection device is captively connected to said ends.

\* \* \* \* \*